United States Patent
Wu et al.

(10) Patent No.: US 9,042,469 B2
(45) Date of Patent: May 26, 2015

(54) RECEIVER AND RECEIVING METHOD FOR A COMBINERLESS LINC OFDM SYSTEM

(71) Applicant: NATIONAL CHIAO TUNG UNIVERSITY, Hsinchu (TW)

(72) Inventors: Wen Rong Wu, Hsinchu (TW); Sheng-Lung Cheng, Taipei (TW); Ying-Pei Hsu, Changhua County (TW)

(73) Assignee: NATIONAL CHIAO TUNG UNIVERSITY (TW)

( * ) Notice: Subject to any disclaimer, the term of this patent is extended or adjusted under 35 U.S.C. 154(b) by 0 days.

(21) Appl. No.: 13/936,754

(22) Filed: Jul. 8, 2013

(65) Prior Publication Data

US 2015/0010114 A1 Jan. 8, 2015

(51) Int. Cl.
*H04K 1/10* (2006.01)
*H04L 27/28* (2006.01)
*H04L 27/26* (2006.01)
*H04L 5/00* (2006.01)

(52) U.S. Cl.
CPC ........... *H04L 27/265* (2013.01); *H04L 27/2647* (2013.01); *H04L 5/0007* (2013.01)

(58) Field of Classification Search
USPC ........................................................ 375/260
See application file for complete search history.

(56) References Cited

U.S. PATENT DOCUMENTS 6,882,217 B1 * 4/2005 Mueller .............................. 330/2
8,446,979 B1 * 5/2013 Yee ................................ 375/296
2005/0129140 A1 * 6/2005 Robinson ....................... 375/297
2010/0091900 A1 * 4/2010 Gan .............................. 375/267
2014/0161209 A1 * 6/2014 Limberg ....................... 375/299

OTHER PUBLICATIONS

Shu et al. (Sangwook Suh ; Kwan-Woo Kim ; Joonhoi Hur ; Kyutae Lim ; Laskar, J.; "MAC Controlled LINC Calibration using Pilot-Aided LSE Channel Estimator for OFDM Systems," IEEE 69th Vehicular Technology Conference, 2009, VTC Spring 2009, pp. 1-5).*

Romano et al. (Romano, L. ; Panseri, L. ; Samori, C. ; Lacaita, A.L.; "Matching requirements in LINC transmitters for OFDM signals," IEEE Transactions on Circuits and Systems I: Regular Papers, vol. 53 , Issue: 7, pp. 1572-1578).*

Dinis et al. (Dinis, R. ; Gusmao, A.; "Signal processing schemes for power/bandwidth efficient OFDM transmission with conventional or LINC transmitter structures," 2001 IEEE International Conference on Communications, ICC 2001, vol. 4, pp. 1021-1027).*

(Continued)

*Primary Examiner* — Shuwang Liu
*Assistant Examiner* — Nader Bolourchi
(74) *Attorney, Agent, or Firm* — Cantor Colburn LLP (57) ABSTRACT

A receiver and a receiving method for use in a LINC OFDM system are provided. The receiver receives a signal from a transmitter of the combinerless LINC OFDM system, generates a CP removed signal by removing a CP from the signal, generates a DFT signal by applying a DFT operation to the CP removed signal, generates a plurality of equalized symbols according to the DFT signal, generates a plurality of soft bits from the equalized symbols, generates a plurality of candidates regarding a transmitted bit sequence based on the soft bits by a list-Viterbi decoding algorithm, and decides an estimated transmitted bit sequence corresponding to the transmitted bit sequence from the candidates. The receiving method is able to perform the operations of the receiver.

10 Claims, 5 Drawing Sheets

(56) References Cited

OTHER PUBLICATIONS

Chen et al. (hen, B. ; Sundberg, C.-E.W.; "List Viterbi algorithms for wireless systems," 2000 IEEE 51st Vehicular Technology Conference Proceedings, VTC 2000, Tokyo. vol. 2; pp. 1016-1020 vol. 2).*

Seshadri et al. (Nambirajan Seshadri and Carl-Erik W. Sundberg; "List Viterbi Decoding Algorithms with Applications," IEEE Transactions on Communications, vol. 42, No. 2/3/4, Feb./Mar./Apr. 1994).*

C. Liang and B. Razavi, "Transmitter linearization by beamforming", IEEE J. Solid-State Circuits, vol. 46, No. 9, pp. 1956-1969 2011.

M. Abd Elaal and F. M. Ghannouchi, "A new LINC Transceivers Architecture for Wireless Radio systems", International Journal of Microwave and Optical Technology, vol. 2, Issue: 2, pp. 134-138, Apr. 2007.

S. Ali, B. Adebisi, G. Markarian and E. Arikan, "Signal combining in LINC amplifier using Alamouti codes", Electronics Letters, vol. 46, No. 18, Sep. 2010.

* cited by examiner

RECEIVER AND RECEIVING METHOD FOR A COMBINERLESS LINC OFDM SYSTEM

CROSS-REFERENCES TO RELATED APPLICATIONS

Not applicable.

BACKGROUND OF THE INVENTION

1. Field of the Invention

The present invention relates to a receiver and a receiving method of an Orthogonal Frequency Division Multiplexing (OFDM) system. More particularly, the present invention relates to a receiver and a receiving method of a combinerless Linear amplification with Nonlinear Component (LINC) OFDM system.

2. Descriptions of the Related Art

Orthogonal Frequency Division Multiplexing (OFDM) is a technique that is commonly used in a wireless communication system. One of the main drawbacks of OFDM systems is its high peak to average power ratio, which yields the high power consumption problem.

Figure 1:
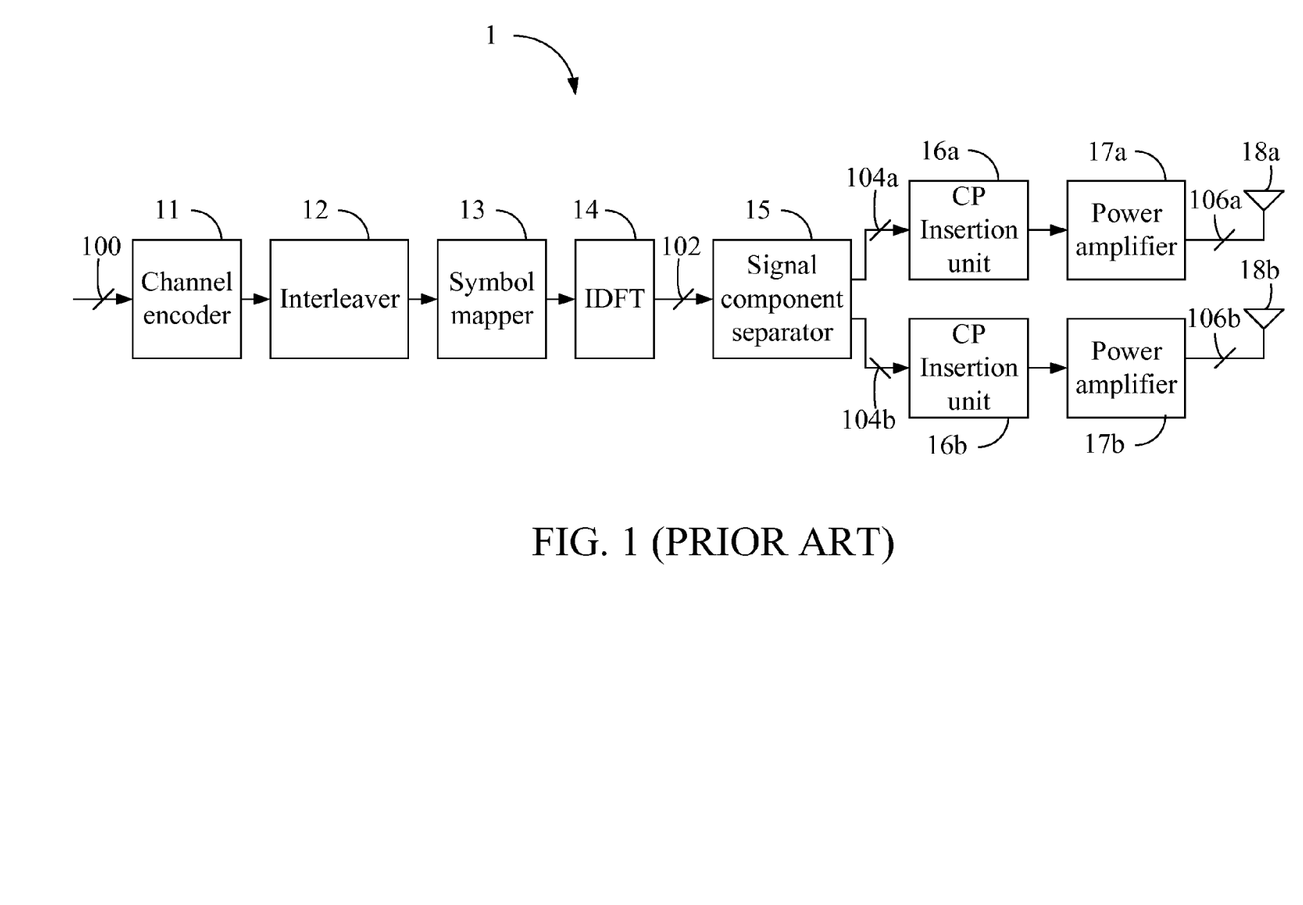
FIG. 1 illustrates a transmitter 1 of a conventional combinerless LINC OFDM system.

The linear amplification with nonlinear component (LINC) technique is an effective remedy to the aforementioned drawbacks. A transmitter 1 of a conventional combinerless LINC OFDM system is illustrated in FIG. 1, which comprises a channel encoder 11, an interleaver 12, a symbol mapper 13, an inverse discrete Fourier transformer 14, a signal component separator 15, two cyclic prefix (CP) insertion units 16a, 16b, two power amplifiers 17a, 17b, and two antennas 18a, 18b.

In the transmitter 1, a bit sequence 100 is processed by the channel encoder 11, the interleaver 12, the symbol mapper 13, and the inverse discrete Fourier transformer 14 in sequence in order to generate an OFDM modulated signal 102. The operations performed by the channel encoder 11, the interleaver 12, the symbol mapper 13, and the inverse discrete Fourier transformer 14 are well-known to people ordinary skilled in the art. Afterwards, the OFDM modulated signal 102 is passed to the signal component separator 15 and then decomposed into two constant-envelope component signals 104a, 104b. Then, the two constant-envelope component signals 104a, 104b are processed by the CP insertion units 16a, 16b and the two high efficiency nonlinear power amplifiers 17a, 17b. Next, the amplified signals 106a, 106b are transmitted by the antennas 18a, 18b, respectively. With the two antennas 18a, 18b, two component signals can be naturally combined at the receiver.

Although conventional combinerless LINC OFDM systems can avoid the drawback of conventional OFDM systems, it yields another problem though. To be more specific, the performance of a receiver of a conventional combinerless LINC-OFDM system will be seriously affected if there is difference, even small, between the channels of the antennas 18a, 18b that the two amplified signals 106a, 106b propagate. Although using a maximum likelihood (ML) detector at the receiver for estimating the bit sequence 100 can effectively solve the problem, its computational complexity is extremely high. Consequently, there is an urgent need in providing a receiving mechanism for combinerless LINC OFDM systems.

SUMMARY OF THE INVENTION

To solve the aforementioned problems of conventional combinerless LINC OFDM systems, the present invention provides a receiver and a receiving method for use in a combinerless Linear amplification with Nonlinear Component (LINC) Orthogonal Frequency Division Multiplexing (OFDM) system.

The receiver of the present invention comprises an antenna, a Cyclic Prefix (CP) remover, a discrete Fourier transformer, an equalizer, a soft demapper, a decoder, and a detector. The antenna is configured to receive a signal from a transmitter of the combinerless LINC OFDM system. The CP remover is electrically connected to the antenna and configured to generate a CP removed signal by removing a CP from the signal. The discrete Fourier transformer is electrically connected to the CP remover and configured to generate a Discrete Fourier Transform (DFT) signal by applying a DFT operation to the CP removed signal. The equalizer is configured to generate a plurality of equalized symbols according to the DFT signal. The soft demapper is electrically connected to the equalizer and configured to generate a plurality of soft bits from the equalized symbols. The decoder is electrically connected to the soft demapper and configured to generate a plurality of candidates regarding a transmitted bit sequence from the transmitter based on the soft bits by a list-Viterbi decoding algorithm, wherein each of the candidates is a predicted bit sequence of the transmitted bit sequence. The detector is electrically connected to the decoder and configured to decide an estimated transmitted bit sequence corresponding to the transmitted bit sequence from the candidates.

The receiving method of the present invention comprises the steps of: (a) receiving a signal from a transmitter of the combinerless LINC OFDM system, (b) generating a CP removed signal by removing a CP from the signal, (c) generating a DFT signal by applying a DFT operation to the CP removed signal, (d) generating a plurality of equalized symbols according to the DFT signal, (e) generating a plurality of soft bits from the equalized symbols, (f) generating a plurality of candidates regarding a transmitted bit sequence from the transmitter based on the soft bits by a list-Viterbi decoding algorithm, wherein each of the candidates is a predicted bit sequence of the transmitted bit sequence, and (g) deciding an estimated transmitted bit sequence corresponding to the transmitted bit sequence from the candidates.

Briefly speaking, the receiver and the receiving method of the present invention adopt a list-Viterb decoding algorithm (LVA) as the decoder. Since the list-Viterbi decoding algorithm can provide a small number of candidates for the subsequent detector, the required computational complexity of the detector can be dramatically reduced. In addition, as the transmitter of the LINC OFDM system comprises two antennas, the equalizer used in the present invention is an enhanced zero-forcing one so that the soft-demapping operation can be effectively conducted. Moreover, interference cancellation mechanism may be adopted in the receiver as well in order to further enhance the performance.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, a receiver and a receiving method for use in a combinerless Linear amplification with Nonlinear Component (LINC) Orthogonal Frequency Division Multiplexing (OFDM) system will be explained with reference to embodiments thereof. However, these embodiments are not intended to limit the present invention to any environments, applications, or implementations described in these embodiments. Therefore, the description of these embodiments is only for the purpose of illustration rather than to limit the present invention. It shall be appreciated that in the following embodiments and attached drawings, elements not directly related to the present invention are omitted from depiction.

Figure 2A:
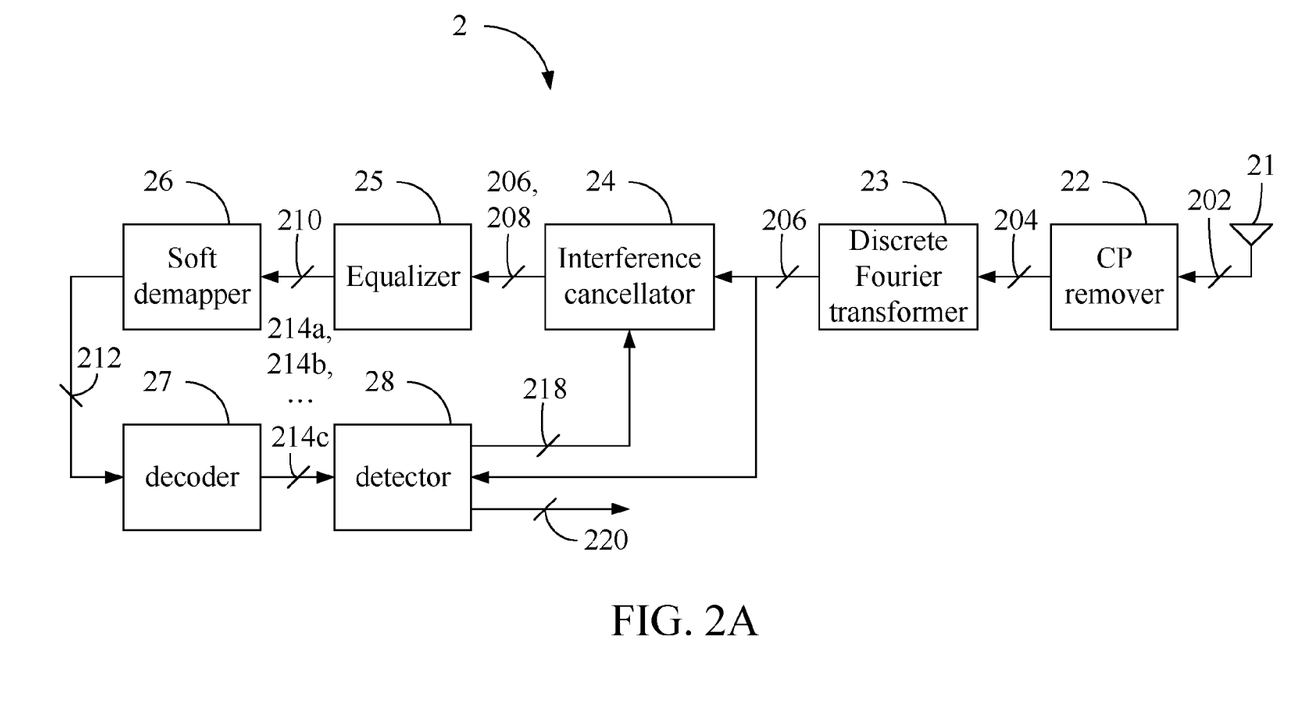
FIG. 2A illustrates a receiver 2 of the first embodiment.

A first embodiment of the present invention is a receiver 2 for use in a combinerless LINC OFDM system and a schematic view of which is illustrated in FIG. 2A. The receiver 2 is able to cooperate with the transmitter 1 drawn in FIG. 1.

The receiver 2 comprises an antenna 21, a cyclic prefix (CP) remover 22, a discrete Fourier transformer 23, an interference cancellator 24, an equalizer 25, a soft demapper 26, a decoder 27, and a detector 28. The CP remover 22 is electrically connected to the antenna 21, the discrete Fourier transformer 23 is electrically connected to the interference cancellator 24, the CP remover 22, and the detector 28, the interference cancellator 24 is electrically connected to the equalizer 25 and the detector 28, the soft demapper 26 is electrically connected to the equalizer 25 and the decoder 27, and the detector 28 is electrically connected to the decoder 27.

The antenna 21 receives a signal 202 from a transmitter (e.g. the transmitter 1 drawn in FIG. 1) of the combinerless LINC OFDM system. The CP remover 22 then generates a CP removed signal 204 by removing a CP from the signal 202. It is noted that the operations performed by the antenna 21 and the CP remover 22 are well known to people ordinary skilled in the art, so the details are not described herein.

Next, the discrete Fourier transformer 23 generates a Discrete Fourier Transform (DFT) signal 206 by applying a DFT operation to the CP removed signal 204. Although the DFT operation is also well known to people ordinary skilled in the art, it should be emphasized that the DFT signal 206 is modeled by the following Equation (1) in the present invention.

$$y = \frac{1}{2}(H_1 + H_2)s + \frac{j}{2}(H_1 - H_2)FC(s_t)F^H s + n \quad (1)$$

In the above equation, the vector y denotes the DFT signal 206, the matrix $H_1$ denotes the channel response of the first antenna of the transmitter, the matrix $H_2$ denotes the channel response of the second antenna of the transmitter, the vector s denotes a plurality of OFDM symbols generated by a symbol mapper of the transmitter (e.g. the symbol mapper 13 shown in FIG. 1), the matrix F denotes the DFT operation, the matrix $F^H$ denotes the inverse DFT operation, and the vector n denotes the noise. The content of the matrix $H_1$ and $H_2$ may be different; that is, the channel response of the first antenna of the transmitter and the channel response of the second antenna of the transmitter may be different. In addition, the vector $s_t$ is equivalent to $F^H s$ and the matrix $C(s_t)$ is represented by the following Equation (2).

$$C(s_t) = \begin{bmatrix} \sqrt{\frac{V_0^2}{|s_{t,0}|^2} - 1} & 0 & \cdots & 0 \\ 0 & \sqrt{\frac{V_0^2}{|s_{t,1}|^2} - 1} & \cdots & 0 \\ \vdots & \vdots & \ddots & \vdots \\ 0 & 0 & \cdots & \sqrt{\frac{V_0^2}{|s_{t,M-1}|^2} - 1} \end{bmatrix} \quad (2)$$

In Equation (2), the variable $V_0$ is a peak magnitude of an OFDM signal of the transmitter, such as that of the OFDM modulated signal 102 shown in FIG. 1. The aforementioned Equation (1) may be written by the following equations.

$$y = \frac{1}{2}(H_1 + H_2)s + \frac{j}{2}(H_1 - H_2)F[C(s_t) - \mu I + \mu I]F^H s + n \quad (3)$$

$$= \frac{1}{2}[(H_1 + H_2) + j\mu(H_1 - H_2)]s + \frac{j}{2}(H_1 - H_2)F(C(s_t) - \mu I)F^H s + n$$

In the above equation, $$\mu = \frac{V_0}{2}\sqrt{\frac{\pi}{E_s}} - \frac{0.45 - \sqrt{\pi E_s}}{V_0}.$$

In addition, the parameter $E_S$ denotes the power of the OFDM symbols, such as that of the OFDM modulated signal 102 shown in FIG. 1.

After the generation of the DFT signal 206, the equalizer 25 generates a plurality of equalized symbols 210 according to the DFT signal 206. Specifically, there are two operation modes. When it is the first mode (i.e. the first iteration for processing the signal 202), the DFT signal 206 is passed to the equalizer 25 directly. That is, the equalizer 25 generates the equalized symbols 210 from the DFT signals 206 directly because there is no interference to be cancelled. When it is the second mode (i.e. the rest iterations for processing the signal 202), the interference cancellator 24 generates an interference cancelled signal 208 by removing interferences from the DFT signal 206 and the equalizer then generates the equalized symbols 210 from the interference cancelled signal 208.

In this embodiment, the equalizer 25 generates the equalized symbols 210 at least according to the DFT signal 206, the first channel response of the first antenna of the transmitter, and the second channel response corresponds to the second antenna of the transmitter. To achieve a better performance, the equalizer 25 may adopt an enhanced zero-forcing mechanism and generate the equalized symbols 210 by the following Equation (4), wherein the vector $\tilde{s}$ represents the equalized symbols 210.

$$\tilde{s} = 2[(H_1 + H_2) + j\mu(H_1 - H_2)]^{-1}y, \text{ wherein} \quad (4)$$

$$\mu = \frac{V_0}{2}\sqrt{\frac{\pi}{E_s}} - \frac{0.45 - \sqrt{\pi E_s}}{V_0}$$

Afterwards, the soft demapper 26 generates a plurality of soft bits 212 from the equalized symbols 210. Since the equalizer 25 is an enhanced zero-forcing one so that the soft-demapping operation performed by the soft demapper 26 can be effectively conducted. The operation performed by the soft demapper 26 is well known to people ordinary skilled in the art, so the details are not described herein.

Then, the decoder 27 generates a plurality of candidates 214a, 214b, . . . , 214c regarding a transmitted bit sequence (e.g. the bit sequence 100) from the transmitter based on the soft bits 212 by a list-Viterbi decoding algorithm, wherein each of the candidates is a predicted bit sequence of the transmitted bit sequence. Since the list-Viterbi decoding algorithm is adopted, the decoder 27 can provide the detector 28 with a small number of the candidates 214a, 214b, . . . , 214c. For example, the number of the candidates 214a, 214b, . . . , 214c may be a predetermined number.

After having the candidates 214a, 214b, . . . , 214c, the detector 28 decides an estimated transmitted bit sequence 220 corresponding to the transmitted bit sequence from the candidates 214a, 214b, . . . , 214c. To be more specific, the detector 28 generates a symbol sequence for each of the candidates 214a, 214b, . . . , 214c, generates an estimated signal for each of the symbol sequences according to a first channel response and a second channel response, compares each of the estimated signals with the signal received from the antenna, and selects the candidate whose corresponding estimated signal is closest to the signal as the estimated transmitted bit sequence.

Figure 2B:
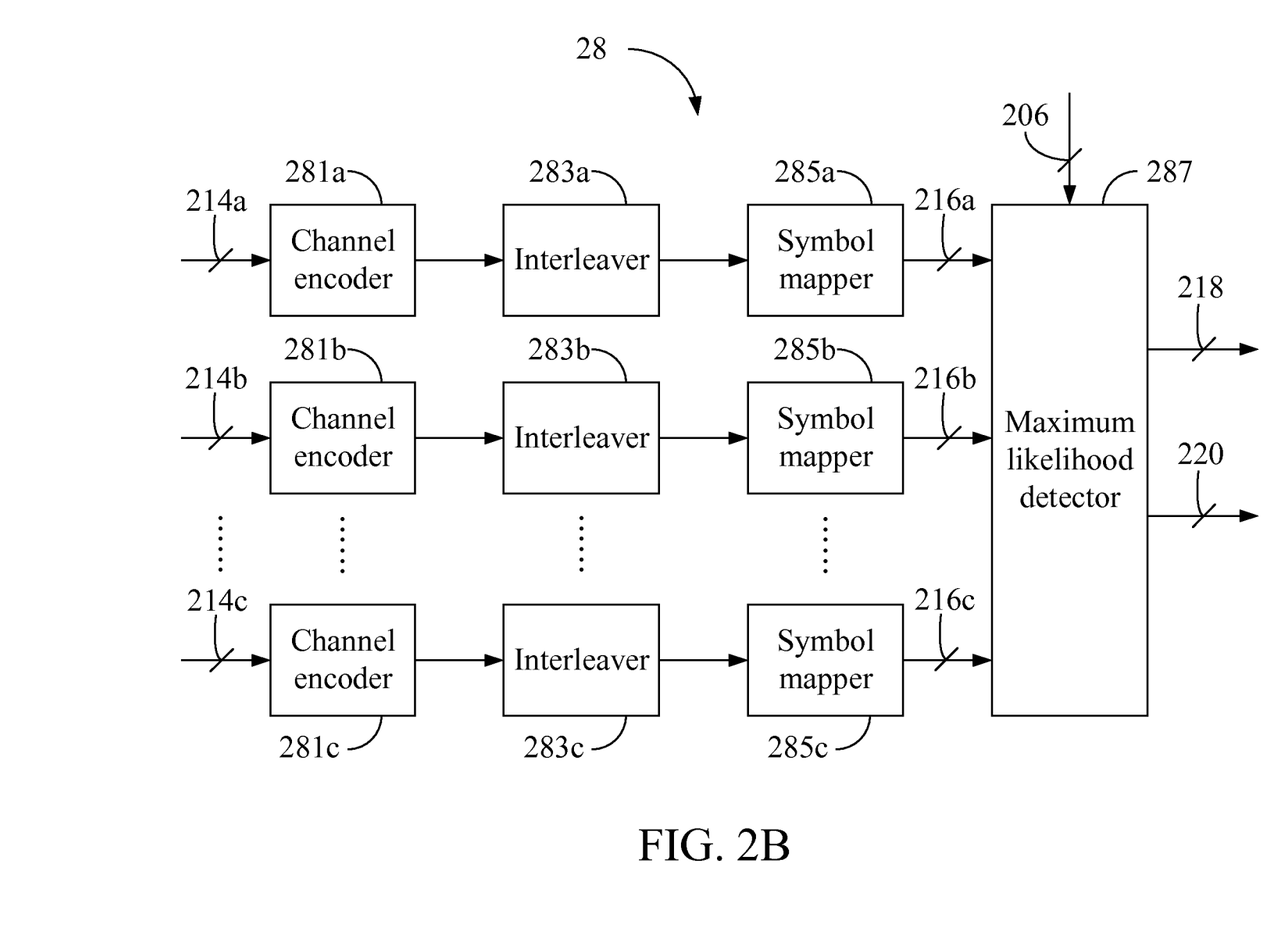
FIG. 2B illustrates an example for realizing the detector 28.

FIG. 2B illustrates an example for realizing the detector 28. The decoder 28 comprises a plurality of channel encoders 281a, 281b, . . . , 281c, a plurality of interleavers 283a, 283b, . . . , 283c, and a plurality of symbol mappers 285a, 285b, . . . , 285c, wherein the operations of each of these elements are familiar to people ordinary skilled in the art. The detector 28 also comprises a maximum likelihood detector 287. The candidate 214a is processed by the channel encoder 281a, the interleaver 283a, and the symbol mapper 285a in sequence, which results in a symbol sequence 216a. Likewise, the candidate 214b is processed by the channel encoder 281b, the interleaver 283b, and the symbol mapper 285b in sequence, which results in a symbol sequence 216b. The candidate 214c is processed by the channel encoder 281c, the interleaver 283c, and the symbol mapper 285c in sequence, which results in a symbol sequence 216c.

Afterwards, the maximum likelihood detector 287 generates an estimated signal (not shown) for each of the symbol sequences 216a, 216b, . . . , 216c according to the channel response of the first antenna of the transmitter and the channel response of the second antenna of the transmitter, compares each of the estimated signals with the DFT signal 206, and selects the candidate whose corresponding estimated signal is closest to the DFT signal 206 as the estimated transmitted bit sequence 220. To achieve the better performance, the maximum likelihood detector 287 may decide the estimated transmitted bit sequence 220 corresponding to the transmitted bit sequence by the following Equation (5).

$$\hat{l} = \arg\min_{1 \le l \le L} \left\| y - \frac{1}{2}(H_1 + H_2)\hat{s}_l + \frac{j}{2}(H_1 - H_2)FC(\hat{s}_{t,l})F^H s_l \right\| \quad (5)$$

After deciding the estimated transmitted bit sequence 220 that corresponds to the transmitted bit sequence, the symbol sequence 218 that corresponds to the estimated transmitted bit sequence 220 will be transmitted to the interference cancellator 24 for cancelling interferences at the next iteration of processing the signal 202 received from the transmitter. To achieve a better performance, the interference cancellator 24 may generate the interference cancelled signal 208 by the following Equation (6):

$$\tilde{y} = y - \xi \frac{j}{2}(H_1 - H_2)F(C(\hat{s}_{D,t}) - \mu I)F^H s. \quad (6)$$

In the above Equation (6), the parameter $\xi$ is a cancellation factor and is smaller than one. It is noted that the interference cancellator 24 only conduct partial interference cancellation in order to control the error propagation effect. With the interference cancelled signal 208 (i.e. $\tilde{y}$), the equalizer 25, the soft demapper 26, the decoder 27, and the detector 28 may operate again. This process can be repeated until a desired number of the iteration is met. The best partial cancellation factor $\xi$ can be determined by simulations. In general, the value of the parameter $\xi$ can be increased as the iteration proceeds since the detected symbols would become more and more reliable.

Figure 3A:
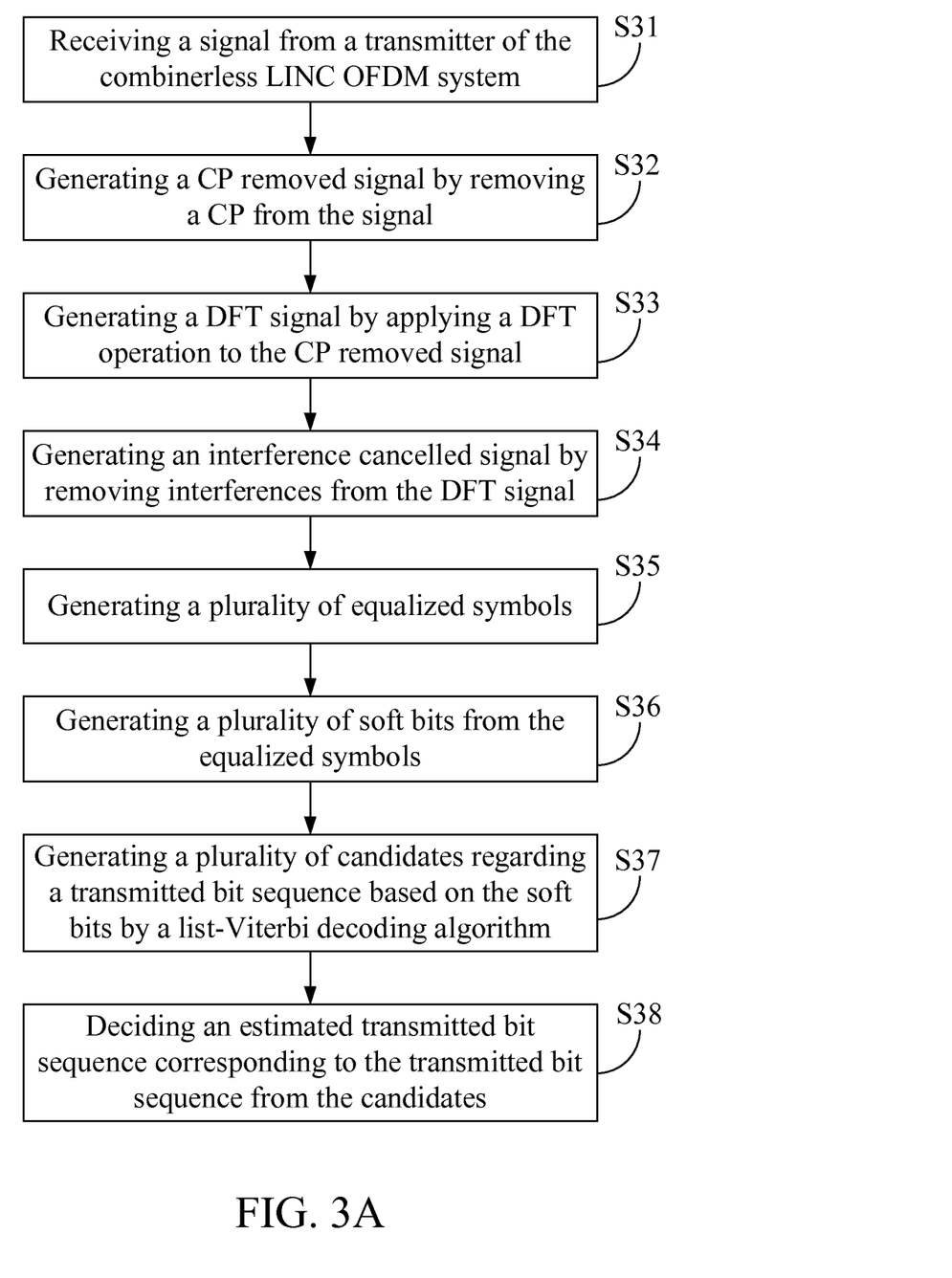
FIG. 3A illustrates a flowchart of the receiving method of the second embodiment.

A second embodiment is a receiving method for a receiver (e.g. the receiver 2 in the first embodiment) of a combinerless LINC OFDM system, a flowchart of which is illustrated in FIG. 3A.

First, step S31 is executed by the receiver for receiving a signal from a transmitter (e.g. the transmitter 1 shown in FIG. 1) of the combinerless LINC OFDM system. Next, step S32 is executed by the receiver for generating a CP removed signal by removing a CP from the signal. Step S33 is then executed by the receiver for generating a DFT signal by applying a DFT operation to the CP removed signal. In this embodiment, the DFT signal is modeled by the above Equation (1).

Next, step S34 is executed by the receiver for generating an interference cancelled signal by removing interferences from the DFT signal. To achieve a better performance, the step S34 may generate the interference cancelled signal by the above Equation (6). Following that, step S35 is executed by the receiver for generating a plurality of equalized symbols according to the DFT signal. If the receiving method is executed for the first iteration, there is no interference to be cancelled. Under such circumstance, the step S34 will be omitted and the step S35 generates the equalized symbols from the DFT signal directly. If the receiving method is executed for the rest iterations, the step S34 will be executed and the step S35 generates the equalized symbols from the interference cancelled signal.

The step S35 generates the equalized symbols according to the DFT signal, a first channel response, and a second channel response, wherein the first channel response corresponds to a first antenna of the transmitter and the second channel response corresponds to a second antenna of the transmitter. The first channel response and the second channel response may be different. To achieve a better performance, the step S35 may generate the equalized symbols by the above equation (4).

Next, step S36 is executed by the receiver for generating a plurality of soft bits from the equalized symbols. Following that, step S37 is executed by the receiver for generating a plurality of candidates regarding a transmitted bit sequence from the transmitter based on the soft bits by a list-Viterbi decoding algorithm. It is noted that each of the candidates is a predicted bit sequence of the transmitted bit sequence and a number of the candidates is a predetermined number. Then, the step S38 is executed by the receiver for deciding an estimated transmitted bit sequence corresponding to the transmitted bit sequence from the candidates.

Figure 3B:
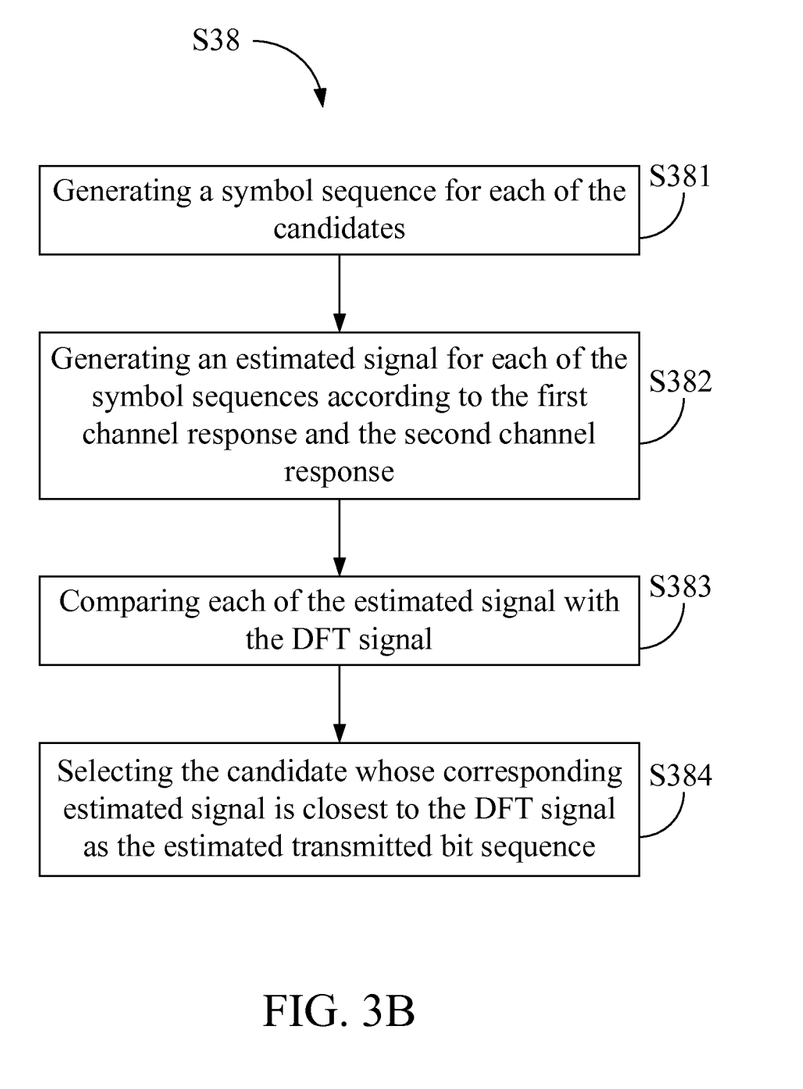
FIG. 3B illustrates a flowchart of the step S38.

To be more specific, the step S38 may be realized by the flowchart shown in FIG. 3B. First, step S381 is executed for generating a symbol sequence for each of the candidates. Next, step S382 is executed by the receiver for generating an estimated signal for each of the symbol sequences according to the first channel response and the second channel response. Following that, step S383 is executed by the receiver for comparing each of the estimated signals with the DFT signal. Afterwards, step S384 is executed by the receiver for selecting the candidate whose corresponding estimated signal is closest to the DFT signal as the estimated transmitted bit sequence. To achieve a better performance, the step S384 may be selects the estimated transmitted bit sequence by the above equation (5).

After deciding the estimated transmitted bit sequence in the step S384, the symbol sequence that corresponds to the estimated transmitted bit sequence will be used by step S34 for cancelling interferences at the next iteration.

In addition to the aforesaid steps, the second embodiment can execute all the operations set forth for the first embodiment. How the second embodiment executes these operations will be readily appreciated by those of ordinary skill in the art based on the explanation of the first embodiment and thus will not be further described therein.

According to the above descriptions, the receiver and the receiving method of the present invention adopt a list-Viterbi decoding algorithm in the decoder. Since the list-Viterbi decoding algorithm can provide a small number of candidates for the subsequent detector, the required computational complexity of the detector can be dramatically reduced. In addition, as the transmitter of the LINC OFDM system comprises two antennas, the equalizer used in the present invention is an enhanced zero-forcing one so that the soft-demapping operation can be effectively conducted. Moreover, interference cancellation mechanism may be adopted in the receiver as well in order to further enhance the performance.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A receiver for use in a combinerless Linear amplification with Nonlinear Component (LINC) Orthogonal Frequency Division Multiplexing (OFDM) system, comprising:
   an antenna, being configured to receive a signal from a transmitter of the combinerless LINC OFDM system;
   a Cyclic Prefix (CP) remover, being electrically connected to the antenna and configured to generate a CP removed signal by removing a CP from the signal;
   a discrete Fourier transformer, being electrically connected to the CP remover and configured to generate a Discrete Fourier Transform (DFT) signal by applying a DFT operation to the CP removed signal;
   an equalizer, being configured to generate a plurality of equalized symbols according to the DFT signal;
   a soft demapper, being electrically connected to the equalizer and configured to generate a plurality of soft bits from the equalized symbols;
   a decoder, being electrically connected to the soft demapper and configured to generate a plurality of candidates regarding a transmitted bit sequence from the transmitter based on the soft bits by a list-Viterbi decoding algorithm, wherein each of the candidates is a predicted bit sequence of the transmitted bit sequence; and
   a detector, being electrically connected to the decoder and configured to decide an estimated transmitted bit sequence corresponding to the transmitted bit sequence from the candidates by generating a symbol sequence for each of the candidates, generating an estimated signal for each of the symbol sequences according to a first channel response and a second channel response, comparing each of the estimated signals with the DFT signal, and selecting the candidate whose corresponding estimated signal is closest to the DFT signal as the estimated transmitted bit sequence.

2. The receiver of claim 1, wherein the equalized symbols are generated by the equalizer according to the DFT signal, a first channel response, and a second channel response, wherein the first channel response corresponds to a first antenna of the transmitter and the second channel response corresponds to a second antenna of the transmitter.

3. The receiver of claim 1, further comprising:
   an interference canceller, being electrically connected to the discrete Fourier transformer and the equalizer and configured to generate an interference cancelled signal by removing interferences from the DFT signal according to the estimated signal that is closest to the signal;
   wherein the equalized symbols are generated from the interference cancelled signal by the equalizer.

4. The receiver of claim 1, wherein the first channel response corresponds to a first antenna of the transmitter, the second channel response corresponds to a second antenna of the transmitter, and the first channel response and the second channel response are different.

5. The receiver of claim 1, wherein a number of the candidates is a predetermined number.

6. A receiving method for a receiver of a combinerless Linear amplification with Nonlinear Component (LINC) Orthogonal Frequency Division Multiplexing (OFDM) system, comprising:
   receiving a signal from a transmitter of the combinerless LINC OFDM system;
   generating a Cyclic Prefix (CP) removed signal by removing a CP from the signal;
   generating a Discrete Fourier Transform (DFT) signal by applying a DFT operation to the CP removed signal;
   generating a plurality of equalized symbols according to the DFT signal;
   generating a plurality of soft bits from the equalized symbols;
   generating a plurality of candidates regarding a transmitted bit sequence from the transmitter based on the soft bits by a list-Viterbi decoding algorithm, wherein each of the candidates is a predicted bit sequence of the transmitted bit sequence; and
   deciding an estimated transmitted bit sequence corresponding to the transmitted bit sequence from the candidates, comprising:
   generating a symbol sequence for each of the candidates;
   generating an estimated signal for each of the symbol sequences according to a first channel response and a second channel response;
   comparing each of the estimated signals with the DFT signal; and
   selecting the candidate whose corresponding estimated signal is closest to the DFT signal as the estimated transmitted bit sequence.

7. The receiving method of claim 6, wherein the equalized symbols are generated according to the DFT signal, a first channel response, and a second channel response, wherein the first channel response corresponds to a first antenna of the transmitter and the second channel response corresponds to a second antenna of the transmitter.

8. The receiving method of claim 6, further comprising:
generating an interference cancelled signal by removing interferences from the DFT signal according to the estimated signal that is closest to the signal;
wherein the equalized symbols are generated from the interference cancelled signal.

9. The receiving method of claim 6, wherein the first channel response corresponds to a first antenna of the transmitter, the second channel response corresponds to a second antenna of the transmitter, and the first channel response and the second channel response are different.

10. The receiving method of claim 6, wherein a number of the candidates is a predetermined number.

* * * * *